(12) United States Patent
Sugano et al.

(10) Patent No.: US 9,822,026 B2
(45) Date of Patent: Nov. 21, 2017

(54) METHOD AND SYSTEM FOR SLUDGE TREATMENT

(71) Applicants: NIPPON ZOKI PHARMACEUTICAL CO., LTD., Osaka (JP); TECHNOPLAN INC., Hyogo (JP)

(72) Inventors: Masahiro Sugano, Osaka (JP); Masakazu Sawai, Hyogo (JP)

(73) Assignees: NIPPON ZOKI PHARMACEUTICAL CO., LTD., Osaka (JP); TECHNOPLAN INC., Hyogo (JP)

( * ) Notice: Subject to any disclaimer, the term of this patent is extended or adjusted under 35 U.S.C. 154(b) by 115 days.

(21) Appl. No.: 14/714,358

(22) Filed: May 18, 2015

(65) Prior Publication Data

US 2015/0360986 A1 Dec. 17, 2015

(30) Foreign Application Priority Data

Jun. 17, 2014 (JP) ................................. 2014-123930
Sep. 18, 2014 (JP) ................................. 2014-190551

(51) Int. Cl.
| | | |
|---|---|---|
| C02F 9/00 | (2006.01) |
| C02F 11/04 | (2006.01) |
| C02F 11/00 | (2006.01) |
| C02F 11/02 | (2006.01) |
| C02F 11/12 | (2006.01) |
| C02F 1/24 | (2006.01) |
| C02F 1/20 | (2006.01) |

(52) U.S. Cl.
CPC .............. C02F 9/00 (2013.01); *C02F 1/20* (2013.01); *C02F 1/24* (2013.01); *C02F 11/04* (2013.01); *C02F 11/12* (2013.01); *C02F 11/127* (2013.01); *Y02E 50/343* (2013.01)

(58) Field of Classification Search
None
See application file for complete search history.

(56) References Cited

FOREIGN PATENT DOCUMENTS

| | | | |
|---|---|---|---|
| JP | 2011-167648 | 9/2011 | |
| JP | 2012045512 A | * 3/2012 | .............. C02F 11/00 |

\* cited by examiner

*Primary Examiner* — Krishnan S Menon
*Assistant Examiner* — Ryan B Huang
(74) *Attorney, Agent, or Firm* — JCIPRNet

(57) ABSTRACT

To provide a sludge treatment method and a sludge treatment system suppressing the fuel costs which can be utilized in the existing treatment facilities that drying and discharging after dehydrating a sludge as a useful improvement for the facility. This invention provides the solution means including a dehydration step of obtaining a dehydrated sludge, a liquefaction step of obtaining a slurry-like sludge, a branching step of branching a digested sludge, a vacuum deaeration step of deaerating a first digested sludge, a reprocessing step of ejecting a high-temperature steam and returning a concentrated digested sludge, a dehydration separation treatment step of separating a second digested sludge, a step of deaerating a digested sludge, a branching step of branching the mixed phase fluid, a step of returning a first mixed phase fluid, and a step of returning a second mixed phase fluid.

4 Claims, 5 Drawing Sheets

METHOD AND SYSTEM FOR SLUDGE TREATMENT

CROSS-REFERENCE TO RELATED APPLICATION

This application claims the priority benefit of Japan Application serial no. 2014-123930, filed on Jun. 17, 2014, and Japan Application serial no. 2014-190551, filed on Sep. 18, 2014. The entirety of each of the above-mentioned patent applications is hereby incorporated by reference herein and made a part of the specification.

BACKGROUND OF THE INVENTION

Field of the Invention

The present invention relates to a sludge treatment method and a sludge treatment system.

Description of Related Art

To produce dehydrated sludge from a sewage sludge, a sewage sludge accumulated in a sludge dehydration tank as raw sludge was conventionally processed for drying directly. To explain the procedure specifically using flow chart in the FIG. 1, a dehydrated sludge B (about 80% moisture content in wet weight basis) discharged from a dehydration step STP1 was processed directly at a drying step STP9 to produce a dried sludge J and discharged.

Also, a methane fermentation reduces the drained weight of solid raw sludge, and methane gas or a digestion gases generated in a methane fermentation process can be utilized as fuel.

The configuration comprises a digestion treatment, a dehydrator for dehydration digested sludge, a dryer for drying a dehydrated sludge, and discharging a dehydrated sludge upon completion of a drying step as a dry sludge (Patent Document 1).

Patent Document 1: Japanese Unexamined Patent Application Publication No. 2011-167648.

In the constitution mentioned above, there was the limit for decrease of the solid quantity of a sludge which could be treated in a digestion tank, and there were the present conditions that fuel costs such as LNG fuel or the heavy oil to use to a dryer increased upon dehydration processing for a digestion sludge by a dryer, and drying by a dryer, and exhausting it as a dry sludge.

SUMMARY OF THE INVENTION

As the utilization method of a digestion gas generated in this invention, it is not limited to the method to use as auxiliary fuel for drying sludge but also it is possible to use the fuel for the purpose of a digestion gas power generation. In such case, this invention is effective to decrease the cost of a digestion gas production and also to increase amount of generated power in the power generation system using a digestion gas.

The first aspect of the present invention has following operations and effects.

(1) To reduce a processing amount of sludge during a drying step, a methane fermentation step must be passed through as described above instead of performing a drying step immediately after a dehydration step.

(2) To optimize the moisture content for a methane fermentation for a dehydrated sludge treated in a dehydration step, a liquefaction step is placed prior to a methane fermentation step.

(1) Furthermore, a first digested sludge in which a part of the separated digested sludge is treated at a methane fermentation step is deaerated at a vacuum deaeration step. An ammonia gas concentration that inhibits a methane fermentation in a sludge is thus reduced that improves a digestibility of a methane fermentation. A deaerated sludge (deaerated sludge) and the gas extracted from a sludge (a deaerated gas) eject high temperature steam at a high speed and sucked into a first vacuum forming step utilizing a high temperature steam as a working fluid to form a vacuum state. Having a deaerated sludge to contact with a high temperature steam under a vacuum state and releasing to atmospheric pressure, the deaerated sludge is decomposed and heated by the condensation impact action and the condensation heat generation of high temperature steam. A heated and solubilized deaerated sludge is thus obtained and concurrently the cell disruption of methane bacteria occurs. Thus, a digestibility and a digestion rate in a methane fermentation can be improved greatly with a sludge in high fluidity and low viscosity at the temperature condition suitable for a methane fermentation which can be obtained by solubilizing and heating a deaerated sludge.

(2) In addition, the intracellular substance of the cells is decomposed as a bait of methane bacteria by destroying methane bacteria cells in a sludge. As described above, a first vacuum forming step can achieve effective and efficient use of energy only with the single operation of ejecting a high temperature steam at a high speed in which the cells of methane bacteria for assisting a methane fermentation promotion is destructed by solubilizing and heating of sludge and also achieve deaeration and vacuum suction of a first digested sludge in a vacuum deaeration step.

(3) On the other hand, the solubilized a deaerated sludge with the deaerated gas and the high temperature steam is returned to the methane fermentation step through a first reprocessing step. A heated and solubilized deaerated sludge is processed with an extracted methane gas, carbon dioxide gas, and ammonia gas during a methane fermentation step. Upon a heated and solubilized deaerated sludge is charged in a methane fermentation step, the temperature in a fermentation tank is increased, which makes possible to produce a high temperature for a methane fermentation processing. Even a solubilized and deaerated sludge is mixed with a slurry-like sludge in a digestion tank, the viscosity of the treated sludge will not be raised much.

Upon the stirring resistance of the treated sludge for a methane fermentation is reduced, the stirred mixture is spread out widely. Thus, a methane fermentation activity is accelerated in combination with a high temperature state, and a reduction of solids is achieved.

The second aspect of the present invention has following operations and effects.

A mixed phase fluid including a deaerated sludge that has undergone condensation effect of high temperature steam in a first vacuum forming step, a high temperature steam, and a deaerated gas, is branched to a first mixed phase fluid and a second mixed phase fluid in a mixed phase fluid branching apparatus, and the mixed phase fluid has following effects.

(1) The stirring resistance is low in a methane fermentation apparatus that a first mixed phase fluid is supplied by a fourth reprocessing step because the viscosity of the treated sludge is lowered and a low pressure is maintained. Thus, a kneading effect is enhanced which supports a methane bacteria to act widely on a sludge. Also, an optimum temperature of a methane fermentation is maintained by the condensation heat effect of high temperature steam. Thus, an efficient digestion is promoted at a methane fermentation step by an elevated temperatures and the stirring effect which shorten the days for fermentation treatment.

(2) Ammonia gas that harms the promotion of a methane fermentation is discharged in the top space of a digestive tank since the gas and sludge containing ammonia gas are deaerated under reduced pressure in a first vacuum forming step and flows separately into a methane fermentation step. A so-called ammonia stripping effect is obtained.

(3) Unlike that discharged from a methane fermentation step, a second mixed phase fluid supplied to a dehydration separation treatment step by a migration processing step improves the efficiency of a dehydration in a dehydration separation treatment apparatus since undergo actions of a first vacuum forming step.

In other words, a digested sludge undergoes condensation impact of ultrasonic waves emitted by the steam (cavitation) and the tissue is destroyed at a first vacuum forming step. The moisture content of a sludge contained in a second mixed phase fluid is lowered by 5 to 10 percent. Thus, the dewaterability of a digested sludge is improved and dehydrated easily.

The third and fourth aspect of the present invention has following operations and effects.

(1) A sludge separated liquid separated in a dehydration separation treatment step extracts a concentrated sludge and a separated liquid individually upon the treatment of a vacuum concentration step comprising a solid-liquid separation step and a flotation concentration step instead of directly discharging a sludge separated liquid separated in a dehydration separation treatment step.

(2) A separated liquid obtained during a solid-liquid separation step within a vacuum concentration step can serve as a working fluid to create a vacuum state upon sent to a second vacuum forming step. Procuring a working fluid from outside of the system is thus not required in a second vacuum forming step.

(3) A concentrated sludge obtained through a flotation concentration step and a solid-liquid separation step within a vacuum concentration step is sent to a solid-gas separation step to separate between gas (a separated gas) and solid (deaerated sludge).

A separated gas is sucked into a second vacuum forming step, and sent to a gas-liquid separation step from a second vacuum forming step with a separated liquid charged from a solid-liquid separation step, and divided into a separated liquid and a deaerated gas.

A separated liquid is returned to a liquefaction step and used for liquefaction, but is also partially used to reflux in a second vacuum forming step. In addition, a dehydration step needs only this returned separated liquid. Thus, no supplementation from outside of the system is required.

Above the sludge concentration method is the combination of the treatment steps including a vacuum concentration step that is a combined step of a solid-liquid separation step and a flotation concentration step, a solid-gas separation step, and a vacuum forming step, which achieves excellent efficiency of sludge concentration, continuous speed up of sludge concentration operation, and efficient and effective utilization of energy with compact and simple configuration.

The fifth and sixth aspect of the present invention has following operations and effects.

A concentrated sludge produced in a vacuum concentration step is sent to a solid-gas separation step for further separation into a separated gas and a deaerated sludge. An aggregate of a separated deaerated sludge is returned again to a dehydration separation treatment step, which results to increase the recovery efficiency of a sludge.

In particular, aggregation degree of suspended solids (SS) of a deaerated sludge returned from a dehydration separation treatment step is higher than aggregation degree of suspended solids (SS) of a separated sludge liquid discharged from a dehydration separation treatment step, which facilitates the generation of a digested dehydrated sludge in a dehydration separation treatment step by improving the efficiency of a dehydration treatment using filtration or the like.

The seventh and eighth aspect of the present invention has following operations and effects.

Following effects occur upon a pulverized carbide mixed at a first carbide supply step with a dehydrated sludge is charged in a liquefaction step and get into a methane fermentation tank with a slurry-like sludge.

(1) Promoting a favorable methane fermentation by increasing the concentration of methanogen in a methane fermentation tank as a pulverized carbide adheres methanogen.

(2) Lowering the steering resistance as the viscous resistance of a digesting sludge is reduced by mixing carbide with organic substance.

Further, following effects also occur by having a second carbide supplying step to mix a pulverized carbide with the sludge separated liquid delivered from the dehydration separation treatment step.

Upon a pulverized carbide mixed in a sludge separated liquid send into a vacuum concentration step and a carbide becomes the core, following effects occur.

(1) In a solid-liquid separation step, promoting aggregation of organic matter in a sludge separated liquid and speed up a solid-liquid separation processing.

(2) In a flotation concentration step, supporting good performance of a flotation concentration by enlarging agglomerates.

Further, following effects also occur by having a third carbide supplying step to mix a pulverized carbide either with the digested sludge from the methane fermentation step or the first digested sludge branched by the branching step.

Upon a pulverized carbide enters into a methane fermentation step again either from a first reprocessing step as a mixture with a first digestion sludge branched by a branching step or from a fourth reprocessing step as a mixture with a digested sludge discharged from a methane fermentation step, following effects occur.

(1) Easier to transport a sludge to a vacuum deaeration apparatus performing vacuum deaeration step as the viscosity of a sludge is reduced upon a pulverized carbide is mixed with a digested sludge or a first digested sludge.

(2) In a methane fermentation step, a carbide is altered to a carbide of the state which holds methanogen upon methanogen resides in a pulverized carbide, and raises the functionality as carrier.

Mixing carbide and sludge lowers the viscosity of a sludge which contributes for lower energy consumption by less steering resistance in a methane fermentation apparatus and shorten the duration of a methane fermentation.

The ninth aspect of the present invention has following operations and effects.

(1) A processing amount of a sludge in a drying apparatus can be decreased by treating in a methane fermentation apparatus as described above rather than drying a raw sludge by a drying apparatus directly from a dehydration apparatus. The moisture content of dehydrated sludge can be optimized for a methane fermentation by adding water in a dehydration apparatus prior to the treatment with a methane fermentation apparatus.

(2) Furthermore, a digested sludge treated in a methane fermentation apparatus is divided, and only the divided first digested sludge is deaerated in a vacuum deaeration apparatus. Thus, ammonia gas concentration that inhibits a methane fermentation in a sludge is reduced that improves a digestibility of a methane fermentation. Furthermore, a deaerated sludge (deaerated sludge) and the gas extracted from a sludge (a deaerated gas) ejects high temperature steam at a high speed, and are sucked by reduced pressure into a first vacuum forming apparatus which forms vacuum state by a high temperature steam as a working fluid.

By making a deaerated sludge to contact with a high temperature steam under a vacuum state and releasing to atmospheric pressure, the condensation impact action and the condensation heat generation of high temperature steam lead the deaerated sludge to be decomposed and heated. Thus, a heated and solubilized deaerated sludge is obtained and the cell disruption of methane bacteria occurs.

Thus, a digestibility and a digestion rate in a methane fermentation can be improved greatly with a sludge in high fluidity and low viscosity at a temperature condition suitable for a methane fermentation which can be obtained by solubilizing and heating a deaerated sludge.

In addition, the intracellular substance of the cells is decomposed as a bait of methane bacteria by destroying methane bacteria cells in a sludge.

As described above, a first vacuum forming apparatus can achieve effective and efficient use of energy only with the single operation of ejecting a high temperature steam at a high speed in which the cells of methane bacteria for assisting a methane fermentation promotion are destructed by solubilizing and heating of sludge and also achieve deaeration and vacuum suction of a first digested sludge in a vacuum deaeration apparatus.

(3) On the other hand, the solubilized a deaerated sludge with the deaerated gas and the high temperature steam is returned to the methane fermentation apparatus through a first reprocessing path.

A heated and solubilized deaerated sludge is charged with an extracted methane gas, carbon dioxide gas, and ammonia gas during a methane fermentation step.

Upon a heated and solubilized deaerated sludge is charged in a methane fermentation step, the temperature in a fermentation tank is increased, which makes possible to produce a high temperature for a methane fermentation processing.

Even a solubilized and deaerated sludge is mixed with a slurry-like sludge in a digestion tank, the viscosity of the treated sludge will not be raised much.

Upon the stirring resistance of the treated sludge for a methane fermentation is reduced, the stirred mixture is spread out widely. Thus, a methane fermentation activity is accelerated in combination with a high temperature state, and a reduction of solids is achieved.

The tenth aspect of the present invention has following operations and effects.

A mixed phase fluid including a deaerated sludge that has undergone condensation effect of high temperature steam in a first vacuum forming step, a high temperature steam, and a deaerated gas, is branched to a first mixed phase fluid and a second mixed phase fluid in a mixed phase fluid branching apparatus, and the mixed phase fluid has following effects.

(1) The stirring resistance is low in a methane fermentation apparatus that a first mixed phase fluid is supplied by a fourth reprocessing step because the viscosity of the treated sludge is lowered and a low pressure is maintained.

Thus, a kneading effect is enhanced which supports a methane bacteria to act widely on a sludge.

Also, an optimum temperature of a methane fermentation is maintained by the condensation heat effect of high temperature steam. Thus, an efficient digestion is promoted at a methane fermentation step by an elevated temperatures and the stirring effect which shorten the days for fermentation treatment.

(2) Ammonia gas that harms the promotion of a methane fermentation is discharged in the top space of a digestive tank since the gas and sludge containing ammonia gas are deaerated under reduced pressure in a first vacuum forming step and flows separately into a methane fermentation step. A so-called ammonia stripping effect is obtained.

(3) Unlike that discharged from a methane fermentation apparatus, a second mixed phase fluid supplied to a dehydration separation treatment apparatus by a migration processing path improves the efficiency of a dehydration in a dehydration separation treatment apparatus since undergo actions of a first vacuum forming apparatus.

In other words, a digested sludge undergoes condensation impact of ultrasonic waves emitted by the steam (cavitation) and the tissue is destroyed at a first vacuum forming apparatus.

The moisture content of a sludge contained in a second mixed phase fluid is lowered by 5 to 10 percent. Thus, the dewaterability of a digested sludge is improved and dehydrated easily.

The eleven and twelfth aspect of the present invention has following operations and effects.

(1) A sludge separated liquid separated in a dehydration separation treatment apparatus extracts a concentrated sludge and a separated liquid individually upon the treatment of a vacuum concentration apparatus comprising a solid-liquid separation apparatus and a flotation concentration apparatus instead of directly discharging a sludge separated liquid separated in a dehydration separation treatment apparatus.

(2) A separated liquid obtained during from a solid-liquid separation apparatus within a vacuum concentration apparatus can serve as a working fluid to create a vacuum state upon sent to a second vacuum forming apparatus. Thus, there is no need to procure a working fluid from outside of the system in a second vacuum forming apparatus.

(3) A concentrated sludge obtained through a flotation concentration apparatus and a solid-liquid separation apparatus within a vacuum concentration apparatus is sent to a solid-gas separation apparatus to separate between gas (a separated gas) and solid (deaerated sludge).

A separated gas is sucked into a second vacuum forming apparatus, and sent to a gas-liquid separation apparatus from a second vacuum forming apparatus with a separated liquid charged from a solid-liquid separation apparatus, and divided into a separated liquid and a deaerated gas.

A separated liquid is returned to a liquefaction apparatus and used for liquefaction, but is also partially used to reflux in a second vacuum forming apparatus. In addition, a dehydration apparatus needs only this returned separated liquid. Thus, no supplementation from outside of the system is required.

Above the sludge concentration method is the combination of the treatment apparatus including vacuum concentration apparatus that a combined apparatus of a solid-liquid separation apparatus and a flotation concentration apparatus, solid-gas separation apparatus, and vacuum forming apparatus, to achieve an excellent efficiency of sludge concentration, continuous speed up of sludge concentration operation, an efficient and effective utilization of energy, with compact and simple configuration.

The thirteenth and fourteenth aspect of the present invention has following operations and effects.

A concentrated sludge produced in a vacuum concentration apparatus is sent to a solid-gas separation apparatus for further separation into a separated gas and a deaerated sludge. An aggregate of a separated deaerated sludge is returned again to a dehydration separation treatment step, which results to increase the recovery efficiency of a sludge.

In particular, aggregation degree of suspended solids (SS) of a deaerated sludge returned from a dehydration separation treatment apparatus is higher than aggregation degree of suspended solids (SS) of a separated sludge liquid discharged from a dehydration separation treatment apparatus, in which a deaerated sludge facilitates the generation of a digested dehydrated sludge in a dehydration separation treatment apparatus by improving the efficiency of a dehydration treatment using filtration or the like.

The fifteenth and sixteenth aspect of the present invention has following operations and effects.

Following effects occurs upon a pulverized carbide mixed at a first carbide supply apparatus with a dehydrated sludge is charged in a liquefaction apparatus and get into a methane fermentation tank with a slurry-like sludge.

(1) Promoting a favorable methane fermentation by increasing the concentration of methanogen in a methane fermentation tank as a pulverized carbide adheres methanogen.

(2) Lowering the steering resistance as the viscous resistance of a digesting sludge is reduced by mixing carbide with organic substance.

Further, following effects also occur by having a second carbide supplying apparatus to mix a pulverized carbide with the sludge separated liquid delivered from the dehydration separation treatment apparatus.

Upon a pulverized carbide mixed in a sludge separated liquid send into a vacuum concentration apparatus and a carbide becomes the core, following effects occur.

(1) In a solid-liquid separation apparatus, promoting aggregation of organic matter in a sludge separated liquid and speed up a solid-liquid separation processing.

(2) In a flotation concentration apparatus, supporting good performance of a flotation concentration by enlarging agglomerates.

Further, following effects also occur by having a third carbide supplying apparatus to mix a pulverized carbide either with the digested sludge from the methane fermentation apparatus or the first digested sludge branched by the branching apparatus.

Upon a pulverized carbide enters into a methane fermentation process again either from a first reprocessing path as a mixture with a first a digestion sludge branched by a branching apparatus or from a fourth reprocessing path as a mixture with a digested sludge discharged from a methane fermentation apparatus, following effects occur.

(1) Easier to transport a sludge to a vacuum deaeration apparatus by performing vacuum deaeration process as the viscosity of a sludge is reduced upon a pulverized carbide is mixed with a digested sludge or a first digested sludge.

(2) In a methane fermentation apparatus, a carbide is altered to the methanogen carried carbide upon methanogen resides in a pulverized carbide, which raises the functionality of methanogen.

Mixing carbide and sludge lowers the viscosity of a sludge and lowers the steering resistance in a methane fermentation apparatus, and so which contributes for lower energy consumption by less steering resistance in a methane fermentation apparatus and shorten the duration of a methane fermentation.

DESCRIPTION OF THE EMBODIMENTS

EXAMPLE 1

Figure 1:
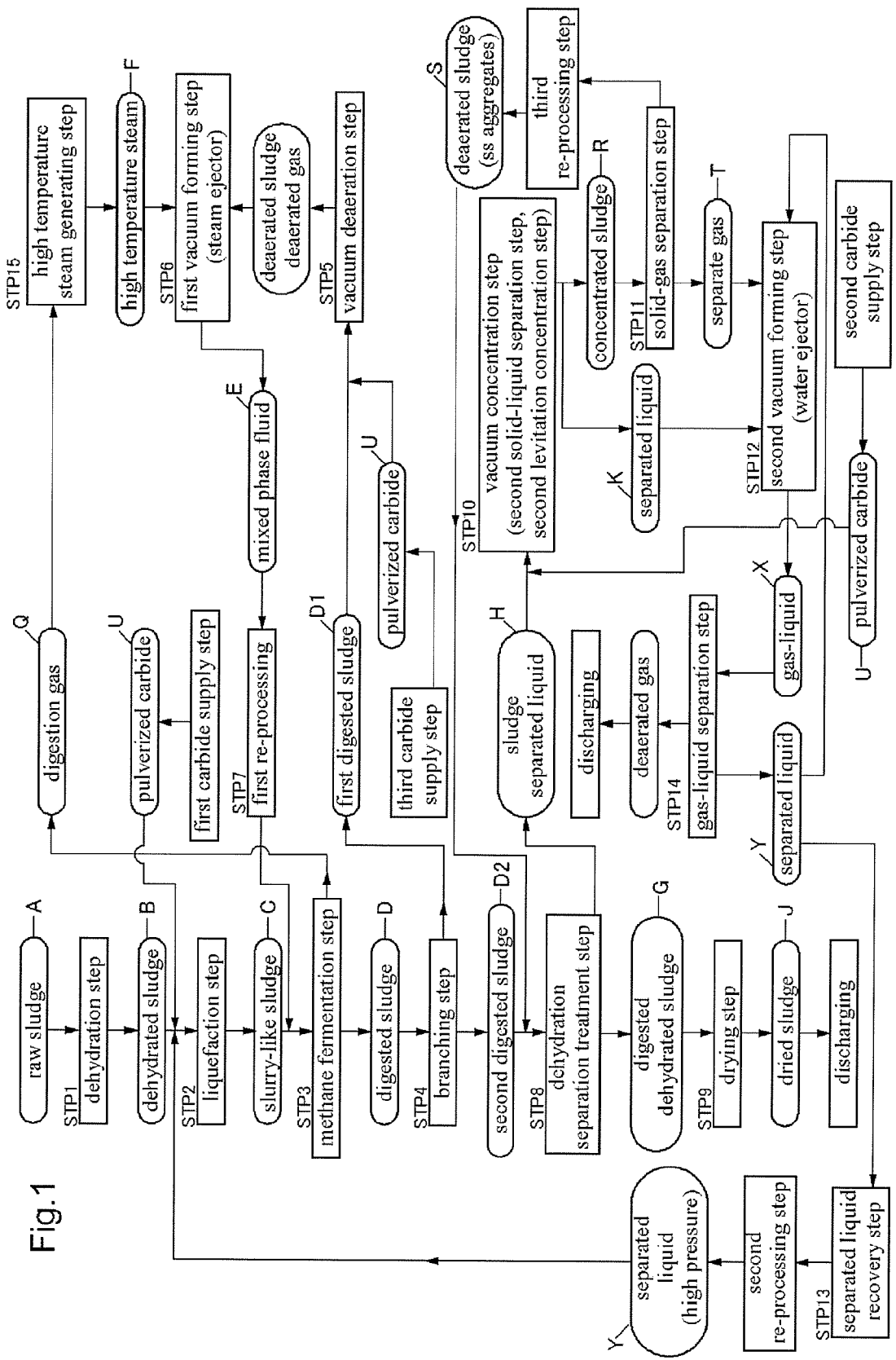
FIG. 1 is the flow diagram showing a sludge treatment method according to a first embodiment of the present invention.

A sludge processing method of the present invention will be explained in detail below. A sludge treatment methods are configured in two stages. A first stage produces a dried sludge from raw sludge. A second stage reuses a sludge separated liquid, which was separated from a digested sludge treated in a dehydration separation treatment step, in a first stage of the treatment system.

(The First Step)

A first step of a sludge treatment process comprises:
 a dehydration step of obtaining dehydrated sludge by dehydration accumulated a sewage sludge or the like in a sludge hopper of dehydration apparatus as raw sludge;
 a first carbide supply step of mixing a pulverized carbide into the dehydrated sludge;
 a liquefaction step of obtaining slurry-like sludge by adding water to the dehydrated sludge mixed with the pulverized carbide;
 a methane fermentation step of obtaining digested sludge by a methane fermentation of the slurry-like sludge;
 a branching step of branching the digested sludge from the methane fermentation step into a first digested sludge and a second digested sludge;
 a third carbide supply step of mixing a pulverized carbide in a first digested sludge branched by the branching step;
 a vacuum deaeration step of obtaining a deaerated sludge and a deaerated gas from the first digested sludge mixed with the pulverized carbide under a reduced pressure state;
 a first vacuum forming step in which a high-temperature steam is discharged at a high speed and a vacuum state is formed to suck the deaerated sludge and the deaerated gas by a vacuum power, wherein the high-temperature steam is used as a working fluid;
 a deaerated sludge returning step of returning a mixed phase fluid including the deaerated gas and the high temperature steam and the deaerated sludge to the methane fermentation step;

a dehydration separation treatment step of separating a second digested sludge branched in the branch step into a sludge separated liquid and a digested dehydrated sludge; and a drying step of obtaining a dry sludge by drying the digested dehydrated sludge.

(Second Step)

A second step of a sludge treatment process comprises:

a second carbide supplying step of mixing a pulverized carbide with the sludge separated liquid delivered from the dehydration separation treatment step;

a vacuum concentration step comprising a solid-liquid separation step of separating the sludge separated liquid mixed with the pulverized carbide into separated liquid and separated sludge by moving a sludge-liquid separation in horizontal or a substantially horizontal direction under an ordinary pressure or under a reduced pressure and the flotation concentration step of obtaining concentrated sludge by levitating a separated sludge by a forming gas obtained by foaming a dissolved gas in a separated sludge under a reduced pressure at downstream of a solid-liquid separation step;

a gas-solid separation step of obtaining a separated gas and a deaerated sludge by degassing the concentrated sludge separated in the vacuum concentration step;

a second vacuum forming step of forming a vacuum state for degassing in the gas-solid separation step and for reducing pressure in the solid-liquid separation step by using a pressurized separated liquid obtained by pressuring a separated liquid produced during a solid-liquid separation step as a working fluid; and a second reprocessing step of returning the treated separated liquid to a dehydration step after a gas-liquid separation step to a gas-liquid including a separated gas in the gas-solid separation step and a separated liquid in the second vacuum forming step, a third reprocessing step of returning a deaerated sludge obtained by the gas-solid separation step to the dehydration separation treatment step.

(Dehydration Step)

A dehydration step STP1 is a step to perform a dehydration treatment to a raw sludge such as a sewage sludge with the 95% or greater water content.

A raw sludge such as a sewage sludge accumulated in sludge dehydration storage tank is centrifuged or compressed. Thereby, water content and solid matter is separated by discharging a moisture from the sludge, and a dehydrated sludge B is obtained.

A dehydrated sludge B is solidified in the form of a cake with about 80% moisture, and transferred to the next step.

The type of raw sludge A is not particularly limited, for example, activated sludge, primary sludge, excess sludge, coagulating sedimentation sludge, septic tank sludge, organic sludge, etc., and activated sludge is preferred.

The activated sludge is denoted as a mud that the floating of the organic matters, inorganic substances, and various protozoa, etc. in sewage adsorbed or attached to the aggregation of microorganisms.

(Liquefaction Step)

A liquefaction step STP2 is a step to convert a dehydrated sludge B, which transported from a dehydration step STP1, into slurry-like sludge. A dehydrated sludge B is transported to a drying step since high moisture content of a raw sludge is not suitable for the transportation. Nevertheless, a step of adding water again to a dehydrated sludge is included in the present invention. A slurry-like sludge C is obtained by adding water intentionally since a dehydrated sludge B itself is the cake-like solid and unable to perform a methane fermentation step STP3. Moisture content of a slurry sludge C is about 90%. Thus, a highly liquid sludge is sent to a methane fermentation step STP3.

(Sludge Mixing Step)

A slurry-like sludge C is charged to a methane fermentation step STP3 through a dehydration step STP2. A sludge mixing step may alternatively be established in between a methane fermentation step STP3 and a dehydration step STP2. In this sludge mixing step, a slurry-like sludge C is mixed with a mixed phase fluid comprising a deaerated gas transmitted from a first reprocessing step described later, solubilized a deaerated sludge, and a high-temperature steam.

To premix a slurry-like sludge C with the mixed phase fluid, rather than separately charging each, achieves higher solid solution. Upon increment of the contact degree between slurry-like sludge and methane bacteria in a methane fermentation step is raised, thus a digestion degree of a methane fermentation is increased (First Carbide Supply Step)

First carbide supply step is a process to feed a pulverized carbides to a methane fermentation tank through a dehydration step STP2. A pulverized carbides is easily supplied to a methane fermentation tank by suspended in a liquid such as water. A carbide is altered to the methanogen carried carbide upon methanogen resides in a pulverized carbide, which raises the functionality of methanogen.

Mixing carbide and sludge lowers the viscosity of a sludge and contribute for energy consumption and shortens the duration of a methane fermentation. The present invention includes three steps of carbide supplying steps. Each or all of a carbide supplying steps may be incorporated as desired into basic method and system of the present invention additionally.

(Methane Fermentation Step)

A methane fermentation step STP3 is a step to obtain a digested sludge D by a methane fermentation of a slurry-like sludge C under anaerobic conditions. The viscosity of a slurry-like sludge C processed in a methane fermentation step STP3 is reduced by the liquefaction STP2. Agitation resistance during the stirring is thus reduced, and methane bacteria is spread over sludge. Increasing a digestion rate of a methane fermentation and achieving high working efficiency thus becomes possible. In addition, the viscosity of a digested sludge D is low, and the self-outflow ability is high, and the smooth draining is thus achieved. A digestion gas Q, such as hydrogen sulfide gas, methane gas, ammonia gas, carbon dioxide gas, is generated in this a methane fermentation step STP3.

(Branching Step)

A branching step STP4 is a step to branch a digested sludge D emitted from a methane fermentation step STP3 into first digested sludge D1 and a second digested sludge D2. A digested sludge D is usually processed in a dehydration step separation treatment STP8 without passing through such branching processing. A first digested sludge D1 performs a deaeration treatment by sending to a vacuum deaeration step STP5 described later. A second digested sludge D2 performs a solid-liquid separation treatment by sending to a dehydration separation treatment step STP6. This step is to perform additional treatment to the divided digested sludge D1 and D2 in order to promote weight loss of solids by digestibility improvements in a methane fermentation and to obtain a dehydrated sludge with further low water content.

(Third Carbide Supply Step)

A third carbide supply step is a process to mix water and a pulverized carbide with a first digested sludge D1 branched at a branching step STP4. Mixing a pulverized carbide with a first digested sludge D1 reduces the viscosity of a sludge and thus the conveyance resistance to a vacuum deaeration apparatus 5 for a vacuum deaeration step STP5 is decreased. Altering to a carbide in the state of holding the methanogens upon methanogens adhere to a pulverized carbides improves the function as a carrier. Also, the viscosity of a sludge is reduced by mixing a sludge with a carbide and it can contribute to the shortening of a methane fermentation duration as well as a reduction of energy consumption due to the decrease of stirring resistance in a methane fermentation apparatus.

(Vacuum Deaeration Step)

Vacuum deaeration step STP5 is a step to foam a first digested sludge D1 branched from a digested sludge D emitted from a methane fermentation step STP3 under reduced pressure and extracts gas from a first a digestion sludge D1. At this step, it is possible to increase a sludge density without impairing high fluidity by deaerating the gas containing in a first digested sludge D1. The containing mixed gas including ammonia gas, hydrogen gas, hydrogen sulfide gas, methane gas, carbon dioxide gas and the like is recovered as a digestion gas Q at a first reprocessing step described later upon sent back to a methane fermentation step STP4 as a sludge, gas, a steam mixed phase fluid. The effort of removing the gas in this vacuum deaeration step can be eliminated. Also, it can separate ammonia gas as the factor inhibiting a methane fermentation from a sludge and improve a digestibility of a methane fermentation.

(High-Temperature Steam Generation Step)

A high-temperature steam generation step STP15 is a step that utilizes a power source Q a digestion gas recovered at a methane fermentation step STP3, and generates a high-temperature steam by a steam boiler F. High temperature steam generated at this step has the function as a working fluid for the ejector in a first vacuum forming step STP6.

In the methane fermentation step STP3, a methane gas can be used as an energy source after performing desulfurization and removing sulfide gas in a digestion gas Q including the gas generated by a methane fermentation and the gas deaerated from first a digestion sludge D1 in the vacuum deaerated step STP5.

For instance, a methane gas can be used as the energy source such as a power source of a digestion gas power generation facilities or a steam boilers for performing ejection of a high-temperature steam F in STP6 first vacuum forming step.

(First Vacuum Forming Step)

First vacuum forming step STP6 is a step to form a vacuum state by jetted high temperature steam F obtained by a high-temperature steam STF15 generation step at a high speed. Concretely, a first vacuum forming step STP6 easily sucks a deaerated gas and a deaerated sludge obtained by the vacuum deaeration step STP5 by a vacuum state generated by pressure loss when a high-temperature steam flow rate F increases while a high-temperature steam F passing through an ejector at a high speed. The deaerated sludge is easily solubilized by condensation impact action and condensation heat made by a high-temperature steam F that ejected in a first vacuum forming step STP6.

(First Reprocessing Step)

First reprocessing step STP7 is a step to return solubilized a deaerated sludge, a high-temperature steam F, and a mixed phase fluid E including a deaerated gas to a methane fermentation step STP3.

A hot steam F, solubilized a deaerated sludge, a deaerated gas are returned to a methane fermentation step STP3 in an integrated manner by using an ejection speed of a high-temperature steam F. Since a high-temperature steam F and a solubilized high-temperature deaerated sludge come refluxed, the temperature inside reaction tank is heated to a high temperature, and the viscosity decreases.

Then, since the high concentration of solubilized a deaerated sludge improves a digestion rate and digestive rate of a methane fermentation under anaerobic conditions, it achieves efficient a methane fermentation of high-concentration sludge.

This solubilized and deaerated sludge is not required to provide the special heating means because an optimum temperature for a methane fermentation can be maintained by contact with a high heat steam F which has been heated as described above.

The temperature of a methane fermentation in a methane fermentation step STP3, for example, can be adjusted to about 35-40 degree Celsius for mesophilic fermentation or about 50-55 degree Celsius for high temperature fermentation.

It is possible to achieve a digestion of a sludge by a methane fermentation effectively and stably in a methane fermentation step STP3 by adjusting an optimum temperature suitable for the fermentation method.

In a solubilized and deaerated sludge of mixed phase fluid E that returned to a methane fermentation step 3 by a first reprocessing STP7, the tissue of methane bacteria has been destructed by condensation shock of high temperature steam, and self-digestion of methane bacteria itself is promoted.

Ammonia gas dissolved in a first digested sludge D1 is deaerated accompanied by water vapor and methane gas, and others by the boiling evaporation phenomenon made by boiling drop under reduced pressure by using a first digested sludge D1 obtained in a methane fermentation step STP3 as a raw sludge. Thus, ammonia gas concentration that inhibits a methane fermentation in a sludge is reduced that improves a digestibility of a methane fermentation.

It can achieve efficient recovery and utilization of the energy saving reliably because it requires no maintain of an optimum temperature for a methane fermentation by the condensation heat effect of hot steam F.

This sludge treatment method is possible to sufficiently exhibit the operations and effects as described in a steps above even though using a digested sludge D obtained in a methane fermentation step STP3 as a raw sludge. It is possible to use similar means for the reduced pressure means and the like.

(Dehydration Separation Treatment Step)

A dehydration separation treatment step STP8 is a step to separate a second digested sludge D2 branched at a branching step STP4 into a digestive dehydrated sludge G and a sludge separated liquid H.

To be specific, a second digested sludge D2 sent from a branching step STP4 is separated into a digested dehydrated sludge G and a sludge separated liquid H by action of the resistance due to the rotation difference of the differential mechanism in the system.

Here focus on is that it is operated to set below about 70 wt. % moisture content on the wet basis for a digested dehydrated sludge G which is to a dried sludge J described later to be the predetermined moisture content.

The relationship between the moisture content rates of a digested dehydrated sludge G and the content rate of the suspended solids (SS) in a sludge separated liquid H is in the mutual relationship, therefore the SS concentration rate of a sludge separated liquid H becomes higher than the normal value and the suspended solids recovery rate thus becomes lower.

(Drying Step)

Drying step STP9 is a step to dry and obtain a dried sludge J from a digested dehydrated sludge G discharged from a dehydration separation treatment step STP8. The moisture content of a dried sludge J is about 10 wt. % on the wet basis.

(Second Carbide Supply Step)

Second carbide supply step is a process to mix a pulverized carbide into a sludge separated liquid H after the treatment in the dehydration separation treatment step STP8. Upon a pulverized carbides mixed with a sludge separated liquid H is fed into a vacuum concentration step STP10, carbide becomes the core, and following effects occurs.

(1) In a solid-liquid separation step, the flocculation of organic matter in a sludge separated liquid H is promoted, which results fast a solid-liquid separation.

(2) In a flotation concentration step, an expansion of aggregate occurs, which results satisfactorily performance of a flotation concentration.

(Vacuum Concentration Step)

Vacuum concentration step STP10 comprising a solid-liquid separation step of separating a sludge separated liquid H into separated liquid and separated sludge by moving in horizontal or a substantially horizontal direction under an ordinary pressure or under a reduced pressure, and a flotation concentration step of obtaining concentrated sludge by levitating a separated sludge by a forming gas obtained by foaming a dissolved gas in a separated sludge under a reduced pressure at downstream of a solid-liquid separation step.

(Solid-Liquid Separation Step)

The solid-liquid separation step is a process to perform a solid-liquid separation of a sludge separation liquid H by perfused it in the horizontal or substantially horizontal direction under reduced pressure into a separated sludge and a separated liquid K.

In a solid-liquid separation step, a dissolved gas in a sludge separation solution H is foamed as a sludge separation solution H is being perfused under reduced pressure in the horizontal or substantially horizontal direction, and a sludge separated liquid H is gradually separated into a liquid component and the solid component comprising such foaming gas.

A sludge separated liquid H is then separated into separated liquid K and separated sludge containing the foaming gas in the downstream of such a sludge separated liquid H flowing through.

That is, a solid-liquid separation step achieves a solid-liquid separation of a sludge separated liquid H only by the simple means of separating a sludge liquid H perfused in the horizontal or substantially horizontal direction under reduced pressure.

Also, a solid-liquid separation step is possible to perform a solid-liquid separation of a sludge separated liquid H fast and continuously without stopping by performing continuous perfusion operations.

In case of perfusion of a sludge separated liquid H is carried out under reduced pressure to a negative pressure in such a vacuum state, it is possible to perform a solid-liquid separation of a sludge separated liquid H described above, for example, about minus 85 kP also, there is no particular limitation on the perfusion rate of a sludge separated liquid H in this case, for example, it is possible to reliably perform a solid-liquid separation with about 0.01 m/sec without stagnant perfusion a sludge separated liquid H.

As the means for perfusion of a sludge separated liquid H to horizontal or substantially horizontal direction, vacuum sucking of a sludge separated liquid H by using a vacuum of a second vacuum foaming step STP12 described later, and the extrusion pressure of a sludge separation liquid H are means to perfuse.

Further, as the means for pressure reducing in a solid-liquid separation step, the utilization of a vacuum state in a second vacuum forming step STP12 described later is available.

(Flotation Concentration Step)

A flotation concentration step is a process to obtain a concentrated sludge R by floating a separated sludge accompanied by foaming gas under reduced pressure in the vertical or substantially vertical direction at the downstream of a solid-liquid separation step.

In this a flotation concentration step, a separated sludge floats in the vertical or substantially vertical direction accompanied by foaming gas because a separated sludge obtained at the downstream of a solid-liquid separation step contains the component of a dissolved gas to foam and foaming of a dissolved gas in a separated sludge under a reduced pressure is accelerated.

In other words, a flotation concentration step can obtain the highly-concentrated concentrated sludge R by concentration effect of the consolidated separated sludge floated and formed the thick layer by the simple means which is the flotation of a separated sludge obtained by a solid-liquid separation step accompanied by gas in the vertical or substantially vertical direction under reduced pressure. As the result, it is possible to further improve a sludge concentration effect.

The emission and collection of the high concentration and high viscosity concentrated sludge is easily achieved from the upper side because the floated concentrated sludge R is accumulated on the top area which is the position of the final point of the floating movement of the vertical or the substantially vertical direction.

This sludge concentration method performs a flotation concentration of a separated sludge and a solid-liquid separation of a sludge separated liquid H in the series of processes that flotation of separated sludge and perfusion of a sludge separated liquid H. Therefore, continuous sludge feeding can be achieved. As the result, the continuous high speed operation of sludge concentration can be achieved.

In short, this sludge concentration method is able to achieve the sufficient sludge concentration effect, facilitating the discharge of a concentrated sludge, and accelerating the continuous sludge concentration operation, in simple and compact structure.

The pressure reducing means in a flotation concentration step is not particularly limited, for example, means to utilize a vacuum of a second vacuum forming step STP12 described below.

A negative pressure in the top area of a flotation concentration step is preferably at minus 65 kPa or more and minus 95 kPa or less, and at minus 75 kPa or more and minus 85 kPa or less is more preferable when a sludge separated liquid H is perfused horizontal or substantially horizontal direction under the reduced pressure in a solid-liquid separation step. Setting a negative pressure in the top area of a flotation concentration step improves the floating speed of separated sludge containing a forming gas which ensures the improvement of the concentration effect caused by compaction of aforementioned separated sludge, and results to improve the ease of the discharge and collection of a concentrated sludge R. The foaming gas in a sludge is excessively promoted when a negative pressure exceeds aforementioned upper limit, in such case the efficiency of accompanying flotation for foaming gas to separated sludge is decreased, and aforementioned sludge concentration effect is reduced. The foaming of a dissolved gases in a sludge becomes insufficient when a negative pressure is less than aforementioned lower limit, in such case the flotation effect to separated sludge is decreased, and aforementioned sludge concentration effect is reduced.

(Solid-Gas Separation Step)

Solid-gas separation step STP11 is a process to obtain a deaerated sludge S (SS aggregates) by deaeration of a retained concentrated sludge R separated in a vacuum concentration step STP10. Accumulated concentrated sludge R fed directly from a flotation concentration step is deaerated utilizing a vacuum state formed by a second vacuum forming step STP12 described later. A deaerated a separated gas T is fed into a second vacuum forming step STP12 described later.

(Second Vacuum Forming Step)

Second vacuum forming step STP12 is a process to form a vacuum state by using a high-pressure water as a working fluid. It specifically uses an ejector as described in a first vacuum forming step STP6. In this case, the ejector is the water ejector utilizing high pressure water, which is different from a steam ejector using high temperature steam as a working fluid as in a first vacuum forming step STP6.

In addition, the water used as a working fluid in a second vacuum forming step STP12 is supplied from two processing steps. One method is to feed pump pressurized separated liquid K, which is discharged from a solid-liquid separation step of a vacuum concentration step STP10, into the water ejector in the STP12. Another method is to reflux the portion of a separated liquid Y accumulated in a tank 17 in a gas-liquid separation step STP14.

(Gas-Liquid Separation Step)

Gas-liquid separation step STP14 is a process to store a gas liquids X, which is high-pressure water discharged from a second vacuum forming step STP12 and integrated with the gas, in a storage tank 17 of a gas-liquid separation step STP14, and separate the gas in the natural pressure without using any special means.

Accumulated separated liquid Y is stored in a storage tank 17.

A separated liquid Y is collected at the same time a deaerated gas is released, and sent to a separated liquid recovery step STP13.

(Second Reprocessing Step)

A second reprocessing step is a process to return a separated liquid Y separated by a gas-liquid separation step STP14 to a dehydration step STP2 by a pump 15.

Additional water supply from outside the system is therefore not necessary in a dehydration step STP2. It is thus possible to conserve the water resources.

(Third Reprocessing Step)

A third reprocessing step is a process to transport and return a deaerated sludge S, which has been deaerated and stored in a solid-gas separation step STP11, to a dehydration separate treatment step STP8 as aggregates of suspended solids (SS). A solid-liquid separation rate in a dehydration separation treatment step STP8 is improved by reprocessing while increasing a sludge concentration rate.

Figure 2:
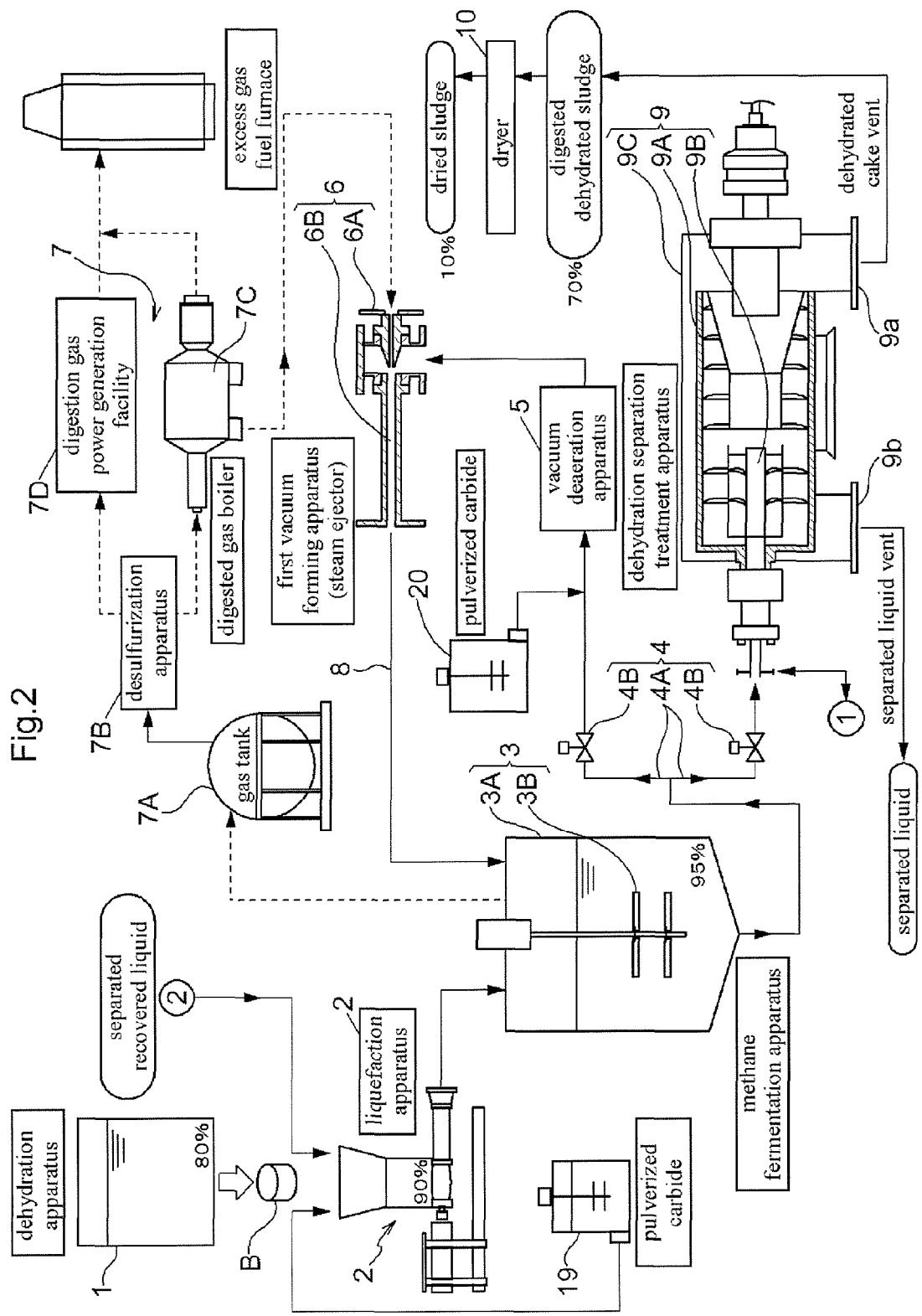
FIG. 2 is the schematic configuration diagram illustrating a first half of part of a sludge treatment system (first stage) according to a first embodiment of the present invention.
Figure 3:
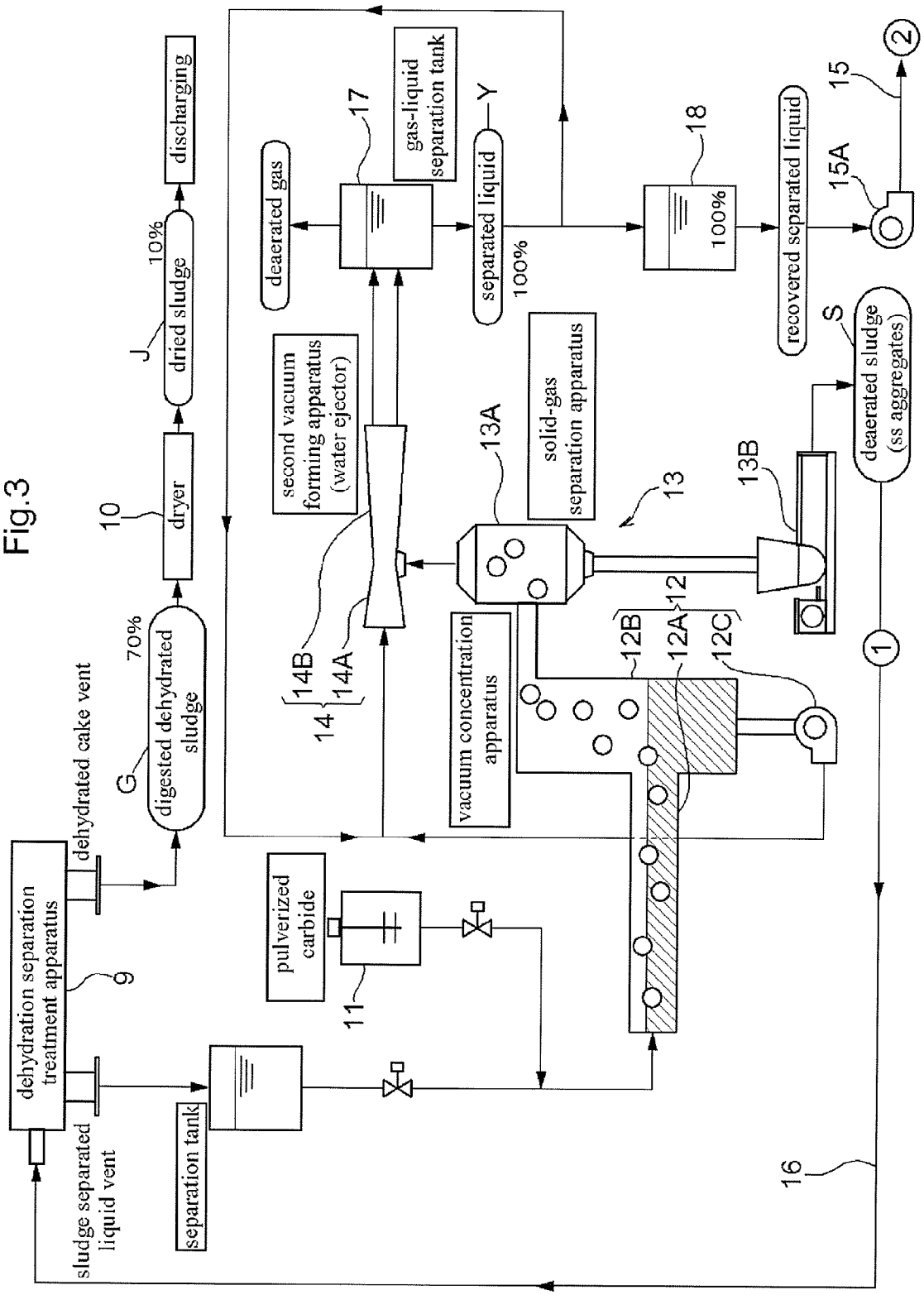
FIG. 3 is the schematic configuration diagram illustrating the latter part of a sludge treatment system (second stage) according to the embodiment of the present invention.

Each processing step has been described above. Next, apparatus is described. FIG. 2 and FIG. 3 illustrate about apparatus.

Below explanation mainly refers to FIG. 2 but also refers some of the reference numerals of FIG. 1.

(Dehydration Apparatus)

Dehydration apparatus 1 is equipped with storage hopper 1 for storing a raw sludge A with screws (not shown in figure) for stirring and emissions, which performs dehydration to a raw sludge A of 95% or more water content to obtain a dehydrated sludge B.

It dehydrates raw sludge and discharges cake-like dehydrated sludge B of about 80 wt. % moisture content.

(First Carbide Supply Apparatus)

First carbide supply apparatus 19 is an equipment to feed a pulverized carbide into a dehydrated sludge B before a processing to feed to liquefaction apparatus 2, in a first carbide supply step. Then, a slurry-like sludge C mixed with a pulverized carbide of a dehydration apparatus 2 is charged into a methane fermentation apparatus 3.

First carbide supply apparatus 19 is equipped with the stirring device, in which a pulverized carbide U are supplied, stirred and mixed into a stored water in a tank. It has effects as stated in a first carbide supply step.

(Liquefaction Apparatus)

A liquefaction apparatus 2 is an equipment to add water to dehydrated sludge B that has been mixed a pulverized carbide in a first carbide supply apparatus to obtain a slurry-like sludge C. In brief, approximately 90 wt. % slurry-like sludge C can be obtained by charging in cake-like dehydrated sludge B into liquefaction apparatus 2 and kneading water and sludge by the screw while adding water.

(Methane Fermentation Apparatus)

Methane fermentation apparatus 3 is an apparatus used in the methane fermentation step. That is, a slurry sludge C fed from the previous step is stored in a methane fermentation tank 3 and obtain a digested sludge by a methane fermentation under anaerobic conditions. In addition, the stirring vanes 3B with the center of a methane fermentation tank 3 accelerate reaction by the stirring.

As described later, a solubilized and deaerated sludge and a deaerated gas in a first reprocessing STP7 is returned to a methane fermentation apparatus 3 with a high-temperature steam. This allows a methane fermentation apparatus 3 to be maintained at high temperature and low pressure. There are following effects.

(1) Less stirring resistance by reducing the viscosity of a sludge. Thus, a kneading effect is enhanced which supports a methane bacteria to act widely on a sludge. Thus, it is possible to shorten the days for fermentation treatment because an efficient digestion is promoted by elevated temperatures and stirring effect.

(2) Since a sludge and the gas containing ammonia gas deaerated under reduced pressure in a first vacuum forming device 6 flow separately into a methane fermentation tank 3A, ammonia gas harming acceleration of a methane fermentation in the upper space of a methane fermentation tank 3A is derived into a digestive gas tank 7A so-called ammonia stripping effect is obtained.

(Branching Apparatus)

Branching apparatus 4 comprises a switching valve 4B attached to two pipes and a trifurcated shaped connection pipe 4A. The destination of a digested sludge can be switched by the opening and closing operation of a switching valve 4B.

The distribution amount of a first digested sludge D1 sending to a vacuum deaeration apparatus 5 described later and a second digested sludge D2 sending to a dehydration separation treatment apparatus 9 can be adjusted upon a flow rate adjustment mechanism (not shown) is added to a switching valve 4B.

(Vacuum Deaeration Apparatus)

Vacuum deaeration apparatus 5 is a reduced pressure deaeration tank for storing a first digested sludge D1 out of a methane fermentation step STP3, and an apparatus to foam sludge under reduced pressure to obtain a deaerated sludge together with gas taken out by foaming.

That is, a first digested sludge D1 stored in a reduced pressure deaeration tank is sucked up by the suction force of a first vacuum forming apparatus 6 described later. Gas is deaerated from a sludge by a vacuum suction.

Note that a sludge and gas can be sucked up together into a first vacuum forming apparatus and unnecessary to take out a separated liquid from the bottom of a vacuum deaeration tank because of low amount of separated liquid as high solids concentration of a first digested sludge D1.

(Third Carbide Supply Apparatus)

A third carbide supply apparatus 20 is an apparatus to charge a mixed phase fluid including a pulverized carbide U and water to a first digested sludge D1 fed from a methane fermentation apparatus 3 into a vacuum deaeration apparatus (vacuum deaeration tank) 5.

A pulverized carbide and water is charged to a third carbide supply apparatus 20 equipped with the stirring spring and mixed them with stirring, and then a mixed phase fluid including a pulverized carbide and water is fed to a vacuum deaeration 5.

When a pulverized carbide mixed with water is charged, microorganisms in sludge are adhered to carbides since a carbide is to function as carriers, the concentration of methane bacteria digestion tank is increased, the viscosity of sludge is lowered, the stirring efficiency is increased, a digestion rate and digestibility of a methane fermentation is increased.

(First Vacuum Forming Apparatus)

First vacuum forming apparatus 6 is a device to form a vacuum state by ejecting a high-temperature steam F as a working fluid. Here, a process to form a vacuum state using a high-temperature steam F as a working fluid of a steam ejector 6 is explained. The flow rate increases as the flow path of a nozzle portion 6A becomes narrower when a high-temperature steam F supplied from the later described a digestion gas boiler 7C is charged into a nozzle portion 6A of a steam ejector 6. The pressure drops when a high-temperature steam F passing through a throat portion to enter to a diffuser portion 6B that the flow path is enlarged.

This pressure drop creates a vacuum state which gives a negative pressure to a vacuum deaeration apparatus 5 connected with a throat portion. A high-temperature steam F is sent to the later described first reprocessing path 8 from a diffuser portion 6B through a node portion with a deaerated gas and a deaerated sludge sucked by a vacuum deaeration apparatus 6.

(High-Temperature Steam, Etc. Generating Facility)

A high-temperature steam, etc. generating facility 7 comprises a gas tank 7A for storing a digestion gas Q discharged from a methane fermentation tank 3A desulfurization apparatus 7B for removing hydrogen sulfide in the gas supplied from a gas tank 7A and a digestion gas boiler 7C to use a digestion gas (methane gas, etc.) from a desulfurization apparatus 7B gas as the fuel. Furthermore, it may add a digestion gas power plant 7D to use a digestion gas from a desulfurization apparatus 7B as fuel.

In addition, a high-temperature steam F from a digestion gas boiler 7C is sent to a steam ejector of the first vacuum forming apparatus 6 and utilized to form a vacuum state. Digestion gas power generation facility 7D is a facility for power generation utilizing a digestion gas such as methane gas as fuel. Electric power generated by this apparatus is preferred for environment because it utilizes a digestion gas Q generated from a sludge.

(First Reprocessing Path)

A first reprocessing path 8 connects a first vacuum forming apparatus 6 (steam ejector) with a methane fermentation apparatus 3 to return a deaerated sludge and gas from a vacuum deaeration apparatus 5 with a hot steam F used in a first vacuum forming apparatus 6 to the methane fermentation apparatus 3.

(Dehydration Separation Treatment Apparatus)

Dehydration separation treatment apparatus 9 separates a second digested sludge branched in a branching apparatus 4 in a digested dehydrated sludge and a sludge separated liquid H.

A dehydration separation treatment apparatus 9 comprises a rotating container 9A referred as ball and a rotating screw 9B located inside a rotary container 9A for transporting sludge.

Although not illustrated, a dehydrated digested sludge G is collected on the rear end side of the inner circumferential wall of a rotating container 9And a sludge separated liquid H is collected to the rotation center side by the rotation speed difference between a rotating container 9And a rotating screw 9B using drive motor, differential motor and differential gears.

A digested sludge dewatered G gathered on the rear end side of the inner peripheral wall of a rotating container 9A is discharged from a sludge discharge opening 9a which is formed at the rear lower part of a casing 9C (dehydrated cake outlet). On the other hand, a sludge separated liquid H collected the rotation center side is discharged from a separated liquid outlet 9b which is formed at the front end below a casing 9C. Digested sludge dewatered G is as described above, the moisture cake dehydrated sludge up to about 70% moisture content in the standard.

Below explanation mainly refers to FIG. 3 but also refers some of the reference numerals of FIG. 1.

(Drying Apparatus)

A Drying apparatus 10 is an apparatus to dry a cake-like dehydrated digestive sludge G separated at a dehydration separation treatment apparatus 9, and produces a dried sludge. A Drying apparatus 10 which has a function of heating a dehydrated digested sludge G to reduce the moisture content to approximately 10% is a burner combustion furnace for a liquefied natural gas (LNG) or heavy oil.

(Second Carbide Supply Apparatus)

Second carbide supply apparatus 11 is an apparatus to mix a pulverized carbide into a sludge separated liquid H after the treatment in the dehydration separation treatment apparatus 9. A sludge separated liquid H mixed with a pulverized carbide is sent to a vacuum concentrator 12. A pulverized carbides may be used in the same manner as a process in a first and third carbide supply apparatus.

(Vacuum Concentration Apparatus)

Vacuum concentration apparatus 12 comprises a solid-liquid separation apparatus 12A for separating a sludge separated liquid H generated during a dehydration separation treatment step into separated liquid and separated sludge by moving a sludge-liquid separation in horizontal or a substantially horizontal direction under an ordinary pressure or under a reduced pressure and a flotation concentration apparatus 12B for obtaining concentrated sludge R by floating separated sludge by a forming gas obtained by foaming a dissolved gas in a separated sludge under a reduced pressure at downstream of a solid-liquid separation apparatus 12B.

Solid-liquid separator 12A is an horizontally placed pipe-shaped apparatus which guides a sludge separated liquid H mixed with a pulverized carbide into the interior space, and perfuse a sludge separated liquid H toward the connecting portion with apparatus 12B by the suction force of a second vacuum forming apparatus 14 to be described later. In the perfusion process, a sludge and liquid are separated, and sludge floated to the surface layer.

A flotation concentration apparatus 12B is an apparatus arranged the pipe-like component along the vertical direction, and a solid-liquid separated sludge and a separated liquid are derived in the interior space. A separated sludge is levitated towards a second vacuum forming apparatus 14 by the suction force of a second vacuum forming apparatus 14 described later. The floated sludge forms the concentrated layer at the ceiling of the top by additional floating force of the foaming gas sucked from a sludge portion by vacuum state. The floated separated sludge can obtain the high concentration of a concentrated sludge R by concentration effect of consolidation, and recovered from the exhaust above a flotation concentrator 12B.

(Solid-Gas Separation Apparatus)

Solid-gas separation apparatus 13 is apparatus to obtain a deaerated sludge S by retaining and deaerating concentrated sludge R separated by vacuum concentrator 12. The rear end of a flotation concentration apparatus 12B of vacuum concentration apparatus 12 is linked to the middle position of a storage hopper 13A to receive a concentrated sludge R from a flotation concentration apparatus 12B. In a storage hopper 13A, the contained gas in a concentrated sludge R sucked by the suction force of a second vacuum forming apparatus 14 described later is fed into a second vacuum forming apparatus 14 as an ejector.

A deaerated sludge S which is remained in the bottom outlet of a storage hopper 13A is turned to aggregates, and taken out. A deaerated sludge S (aggregates) is returned to a dehydration separation treatment apparatus 9 by a pump 13B.

(Second Vacuum Forming Apparatus)

Second vacuum forming apparatus 14 forms a vacuum state by a high-pressure water as a working fluid. A separated water discharged from a floatation concentration apparatus 12B is pressurized by a pump 12C to obtain a high-pressure water.

A high-pressure water is charged to a nozzle portion 14A of the ejector. Then, the flow rate of a high pressure water passing through a nozzle portion 14A is increased as the flow path is throttled and narrowed. A high pressure water passes through a throat portion between a nozzle portion 14 and a diffuser portion 14B, and the pressure drops at a diffuser portion 14B where the flow path is increased. This pressure drop creates a vacuum state, and the interior of a storage hopper 13A of a solid-gas separation apparatus 13 that connected with a throat portion becomes in a negative pressure. A high pressure water is discharged from a diffuser section 14B along with a separated gas T of sucked from a throat portion without reducing much of initial speed although the channel diffuser portion 14B is enlarged.

(Gas-Liquid Separation Apparatus)

A gas-liquid separator 17 is apparatus for extracting a separated liquid Y from the bottom outlet at the same time releasing a dissolved gases in air by natural airflow and storing a gas liquid X containing the high-pressure separated liquid K and a separated gas T in the separation tank 17. A separated liquid Y is a liquid about 100% of water content in terms of moisture, and sent to a second reprocessing path 15 described later after being temporarily stored in a separated liquid recovery tank 18.

(Second Reprocessing Path)

A second reprocessing path 15 is a path that returns a separated liquid Y stored in a separated liquid recovery tank 18 to a dehydration apparatus 2 by a pump 15A. Therefore, a dehydration apparatus 2 can conserve the water resources because the supply of additional water from outside of the system is not necessary.

(Third Reprocessing Path)

A third reprocessing path 16 is a path that returns a deaerated sludge (SS aggregate) S obtained in a solid-gas separation apparatus 13 to the beginning of processing area of a dehydration separation treatment apparatus 9. Thus, the ease of drying treatment is ensured by returning the SS aggregates to a dehydration separation treatment apparatus 9 for further increasing the ratio of solids.

(Second Embodiment)

Here described is a second embodiment for a sludge treatment system and method in which a first step is different from a first embodiment. Note that a second step of a second embodiment is substantially the same as in a first embodiment.

(Another Embodiment of a First Stage)

A first step in a sludge treatment method of a second embodiment is nearly the same steps except having a branching step to separate a digested sludge out of a methane fermentation step into a first digested sludge and a second digested sludge as a first embodiment and comprises:

a dehydration step of obtaining a dehydrated sludge by applying dehydration treatment to a raw sludge;

a first carbide supply step of mixing a pulverized carbide into the dehydrated sludge;

a methane fermentation step in which a methane fermentation is performed on the slurry-like sludge to obtain a digested sludge;

a third carbide supplying step of mixing a pulverized carbide;

a vacuum deaeration step in which a digested sludge mixed with a pulverized carbide coming from a methane fermentation is deaerated under a reduced pressure state to obtain a deaerated sludge and a deaerated gas; and a first vacuum forming step in which a high-temperature steam is discharged at a high speed to form a vacuum state to suck the deaerated sludge and the deaerated gas by a vacuum power, wherein the high-temperature steam is used as a working fluid.

It is different from a first embodiment by having following steps:

a mixed phase fluid branching step in which a mixed phase fluid including the deaerated sludge, the high-temperature steam, and the deaerated gas is branched into a first mixed phase fluid and a second mixed phase;

a fourth reprocessing step in which a first mixed phase fluid branched by the mixed phase fluid branching step is returned to the methane fermentation step;

a transition treatment step in which a second mixed phase fluid branched by the mixed phase fluid branching step is fed into a dehydration separation treatment step;

a dehydration separation treatment step in which a second mixed phase fluid fed by the transition treatment step is separated into a sludge separated liquid and digestive dehydrated sludge; and a drying step of obtaining a dry sludge by drying the digested dehydrated sludge.

Figure 4:
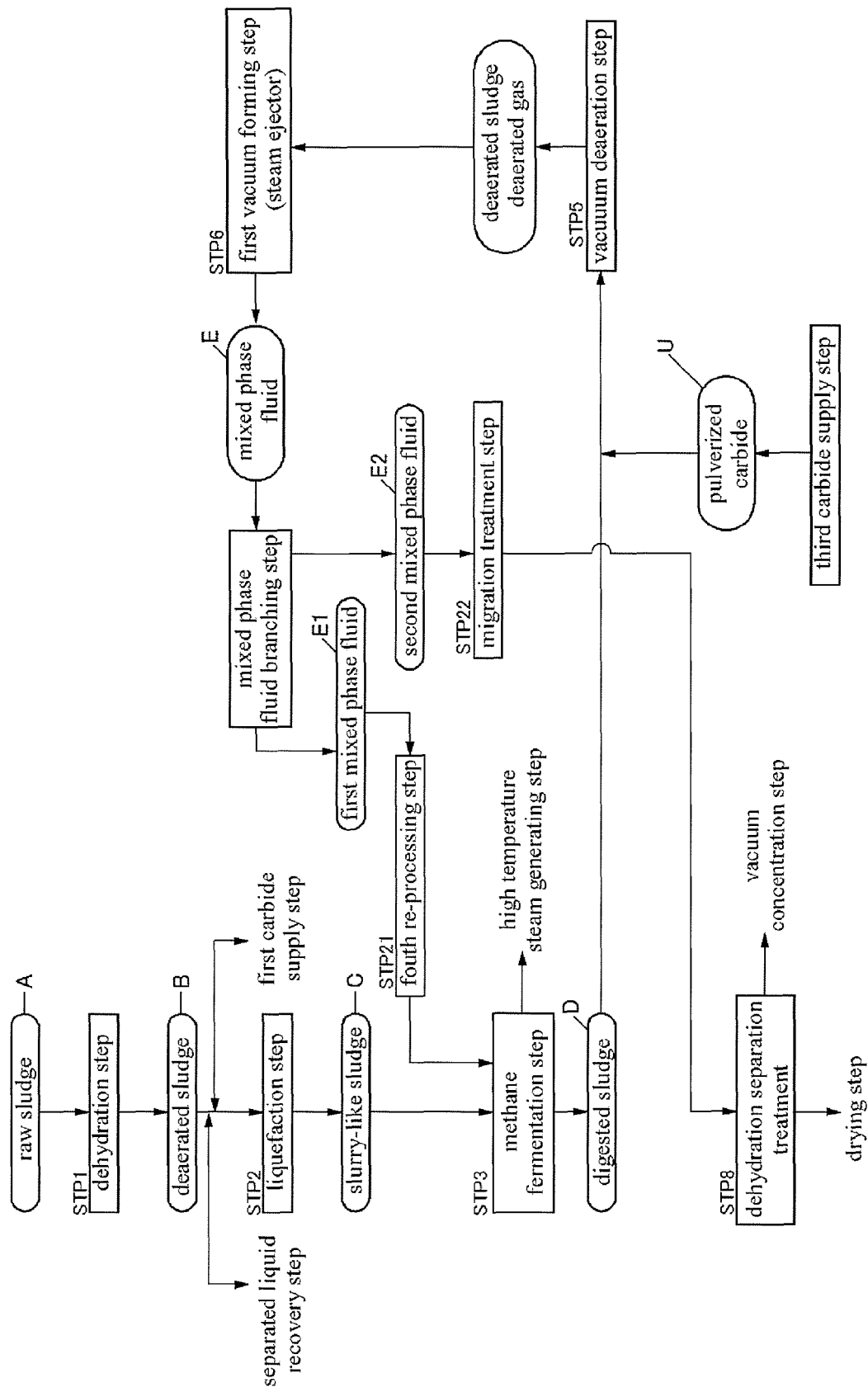
FIG. 4 is the flow diagram showing a sludge treatment method according to a second embodiment of the present invention.

Based on FIG. 4, below is described each step of the first stage of a second embodiment except steps different from a first embodiment which includes a dehydration step STP1, a first carbide supply step, a dehydration step STP2, a methane fermentation step STP3, a vacuum deaeration step STP5, and a first vacuum formation step STP6.

(Mixed Phase Fluid Branching Step)

A mixed phase fluid E, in which the steam used for vacuum forming is mixed with a deaerated gas sucked and extracted from digested sludge D and a deaerated sludge based on a digested sludge D, is treated in a first vacuum forming step STP6. A mixed phase fluid is discharged from a first vacuum formation step STP6.

At a mixed phase fluid branching step STP20, this mixed phase fluid E is branched to a first mixed phase fluid E1 and to a second mixed phase fluid E2.

(Fourth Reprocessing Step)

At a fourth reprocessing STP21, a first mixed phase fluid E1 that branched in a mixed phase fluid branching step STP20 is fed again to a methane fermentation step STP3.

As described above, a methane fermentation apparatus 3 is maintained at high temperature and low pressure since a first mixed phase fluid E1 is undergoing condensation and other effects in a first vacuum forming step STP6 and the operations and effects are as follow;

Less stirring resistance by the viscosity of a sludge is reduced. Thus, a kneading effect is enhanced which supports a methane bacteria to act widely on a sludge. Thus, an efficient digestion is promoted at a methane fermentation apparatus 3 by an elevated temperatures and the stirring effect which shorten the days for fermentation treatment.

Ammonia gas that harms the promotion of a methane fermentation is discharged in the top space of a digestive tank since the gas and sludge containing ammonia gas are deaerated under reduced pressure in a first vacuum forming step and flows separately into a methane fermentation tank 3A. A so-called ammonia stripping effect is obtained.

(Transition Treatment Step)

A transition treatment step STP22 is a step of feeding a second mixed phase fluid E2 branched by a mixed phase fluid branching step STP20 into a dehydration separation treatment step STP8.

A second mixed phase fluid E2 branched in mixed phase fluid branching step STP20 is sent to a dehydration separation treatment step STP8 through a transition treatment step STP22.

Unlike that discharged from a methane fermentation step STP3, a second mixed phase fluid E2 improves the efficiency of a dehydration in a dehydration separation treatment step STP8 since undergo actions of a first vacuum forming step STP6.

That is, in a first vacuum forming step STP6, a digested sludge D undergoes condensation impact of ultrasonic waves emitted by the steam (cavitation) and the tissue is destroyed. Thus, it is easily dehydrated since the dewaterability of a digested sludge D is improved as the water content of a sludge is reduced by 5-10%.

Figure 5:
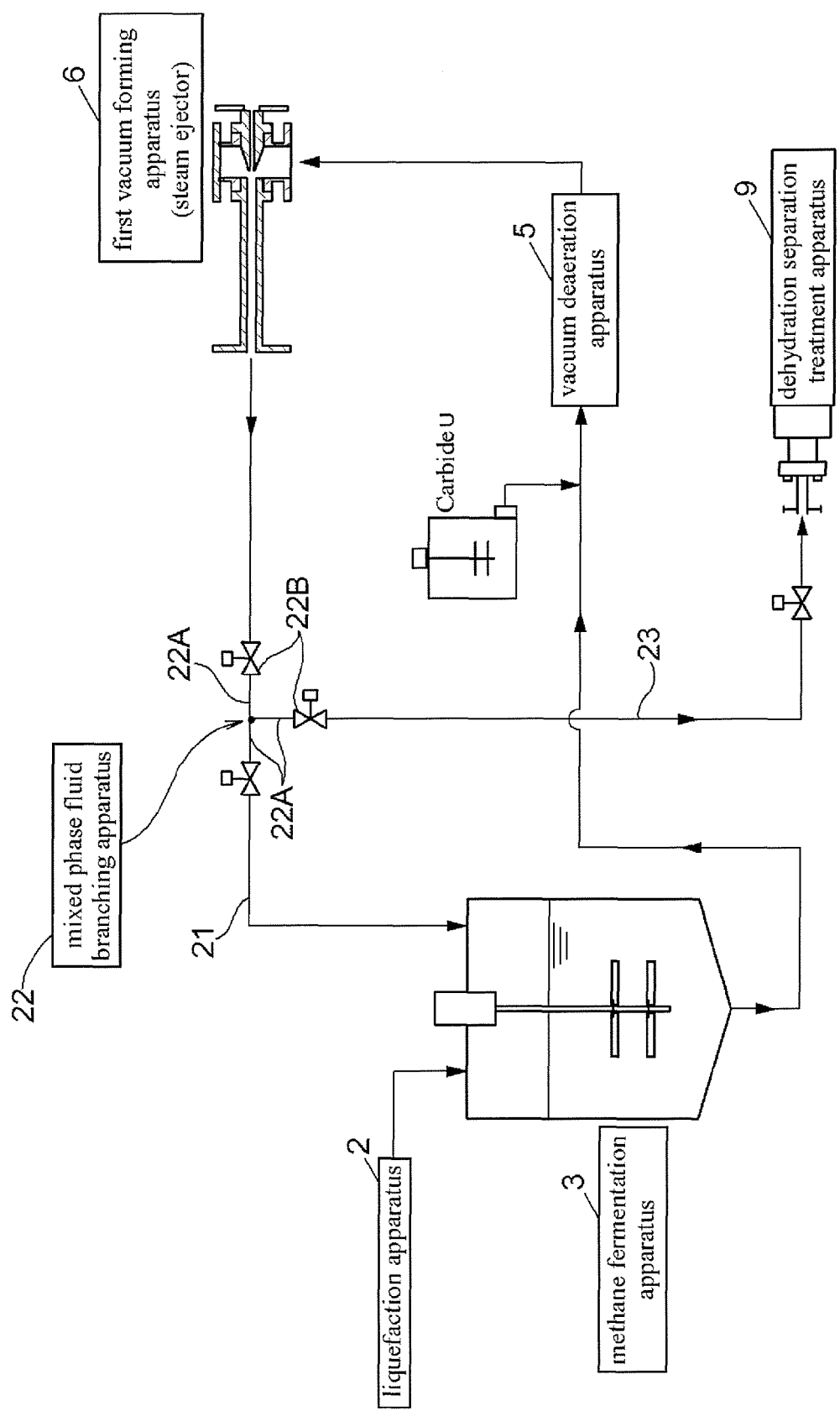
FIG. 5 is the schematic configuration diagram illustrating a first half part of a sludge treatment system according to a second embodiment of the present invention (first stage).

Next, with reference to FIG. 5, apparatus used in a first stage of a second embodiment described above is explained.

(Mixed Phase Fluid Branching Apparatus)

A mixed phase fluid branching apparatus 22 branches a mixed phase fluid E ejected from a first vacuum forming apparatus 6 to a first mixed phase fluid E1 and a second mixed phase fluid E2.

A mixed phase fluid branching apparatus 22 comprises a switching valve 22B attached to the two pipes and the trifurcated shaped connection pipe 22A.

The destination of a mixed phase fluid E is possible to switch by the opening and closing operation of a switching valve 22B.

The distribution amount of a first mixed phase fluid E1 sending to a methane fermentation apparatus 3 and a second mixed phase fluid E2 sending to a dehydration separation treatment apparatus 9 is possible to adjust by adding the flow rate adjustment mechanism on a switching valve 22B (not shown).

(Fourth Reprocessing Path)

A fourth reprocessing path 21 connected to a connecting pipe 22A of a mixed phase fluid branching apparatus 22 is a path for feeding a first mixed phase fluid E1 branched in mixed phase fluid branch apparatus 22 to a methane fermentation apparatus 3.

As described above, a methane fermentation apparatus 3 is maintained at high temperature and low pressure since a first mixed phase fluid E1 is undergoing condensation and other effects in a first vacuum forming step STP6 and the operations and effects are as follow;

Less stirring resistance by reducing the viscosity of a sludge. Thus, a kneading effect is enhanced which supports a methane bacteria to act widely on a sludge. Thus, an efficient digestion is promoted at a methane fermentation apparatus 3 by an elevated temperatures and the stirring effect which shorten the days for fermentation treatment.

Since a sludge and the gas containing ammonia gas deaerated under reduced pressure in a first vacuum forming device 6 flow separately into a methane fermentation tank 3 Ammonia gas harming acceleration of a methane fermentation in the upper space of a methane fermentation tank 3A is derived into a digestive gas tank 7A. A so-called ammonia stripping effect is obtained.

(Migration Process Path)

A migration path 23 is a path for feeding a second mixed phase fluid E2 branched in a mixed phase fluid branching apparatus 22 to a dehydration separation treatment apparatus 9.

A second mixed phase fluid E2 branched in a mixed phase fluid branching apparatus 22 is sent to a dehydration separation treatment apparatus 9 via migration processing path 23.

Unlike that discharged from a methane fermentation apparatus 3, a second mixed phase fluid E2 improves the efficiency of a dehydration in a dehydration separation treatment apparatus 9 since undergo actions of a first vacuum forming apparatus 6. That is, in a first vacuum forming apparatus 6, a digested sludge undergoes condensation impact of ultrasonic waves emitted by a steam (cavitation) and the tissue is destroyed. Thus, it is easily dehydrated since the dewaterability of a digested sludge D is improved as the water content of a sludge is reduced by 5-10%.

INDUSTRIAL APPLICABILITY

As described above, a sludge treatment methods and system of the present invention can be used in processing such as activated sludge, primary sludge, excess sludge, flocculation sludge, and septic tank sludge.

What is claimed is:

1. A sludge treatment method, comprising:
a dehydration step of obtaining a dehydrated sludge by applying dehydration treatment to a raw sludge;

a liquefaction step in which water is added to the dehydrated sludge to obtain a slurry-like sludge;

a methane fermentation step in which a methane fermentation is performed on the slurry-like sludge to obtain a digested sludge;

a branching step in which the digested sludge from the methane fermentation step is branched into a first digested sludge and a second digested sludge;

a vacuum deaeration step in which the first digested sludge is deaerated under a reduced pressure state to obtain a deaerated sludge and a deaerated gas;

a first vacuum forming step in which a high-temperature steam is discharged at a high speed to form a vacuum state to suck the deaerated sludge and the deaerated gas by a vacuum power, wherein the high-temperature steam is used as a working fluid;

a reprocessing step in which the deaerated sludge with the deaerated gas and the high temperature steam is returned to the methane fermentation step; and a dehydration separation treatment step in which the second digested sludge branched in the branching step is separated into a sludge separated liquid and a digested dehydrated sludge.

2. The sludge treatment method according to claim 1, after the dehydration separation treatment step, further comprising:

a vacuum concentration step comprising:

a solid-liquid separation step of separating the sludge separated liquid generated during the dehydration separation treatment step into a separated liquid and a separated sludge by moving the sludge separated liquid in a horizontal or a substantially horizontal direction under an ordinary pressure or under a reduced pressure; and a flotation concentration step of obtaining a concentrated sludge by levitating the separated sludge by a forming gas obtained by foaming a dissolved gas in the separated sludge under a reduced pressure at downstream of the solid-liquid separation step;

a gas-solid separation step of obtaining a separated gas and a deaerated sludge by degassing the concentrated sludge separated in the vacuum concentration step;

a second vacuum forming step of forming a vacuum state for degassing in the gas-solid separation step and for reducing pressure in the solid-liquid separation step by using a pressurized separated liquid obtained by pressuring the separated liquid produced during the solid-liquid separation step as a working fluid; and a step of returning a separated liquid produced at a gas-liquid separation treatment of a gas-liquid integrated the separated liquid from the second vacuum forming step with the separated gas from the gas-solid separation step to the liquefaction step.

3. The sludge treatment method according to claim 2, further comprising a third reprocessing step of returning the deaerated sludge produced during the gas-solid separation step to the dehydration separation treatment step.

4. The sludge treatment method according to claim 3, further comprising performing at least one of the following steps:

a first carbide supply step to mix a pulverized carbide into the dehydrated sludge treated in the dehydration step;

a second carbide supply step to mix a pulverized carbide into the sludge separated liquid treated at the dehydration separation step; and a third carbide supply step to mix a pulverized carbide into the first digested sludge branched by the branching step or the digested sludge from the methane fermentation step.

* * * * *